March 22, 1932. F. H. MACNEIL 1,850,759
JUNCTION BOX
Filed Oct. 15, 1929

Inventor:
Frederick H. Macneil,
by Emery, Booth, Varney & Townsend
Attys.

Patented Mar. 22, 1932

1,850,759

UNITED STATES PATENT OFFICE

FREDERICK H. MACNEIL, OF BOSTON, MASSACHUSETTS

JUNCTION BOX

Application filed October 15, 1929. Serial No. 399,755.

This invention relates to junction boxes for electric wiring and the object is to provide a single fitting adaptable for use in various locations in place of separate fittings of differing form as customarily used.

My invention will be well understood by reference to the following description of an illustrative form thereof shown by way of example in the accompanying drawings, wherein:—

Figure 1:
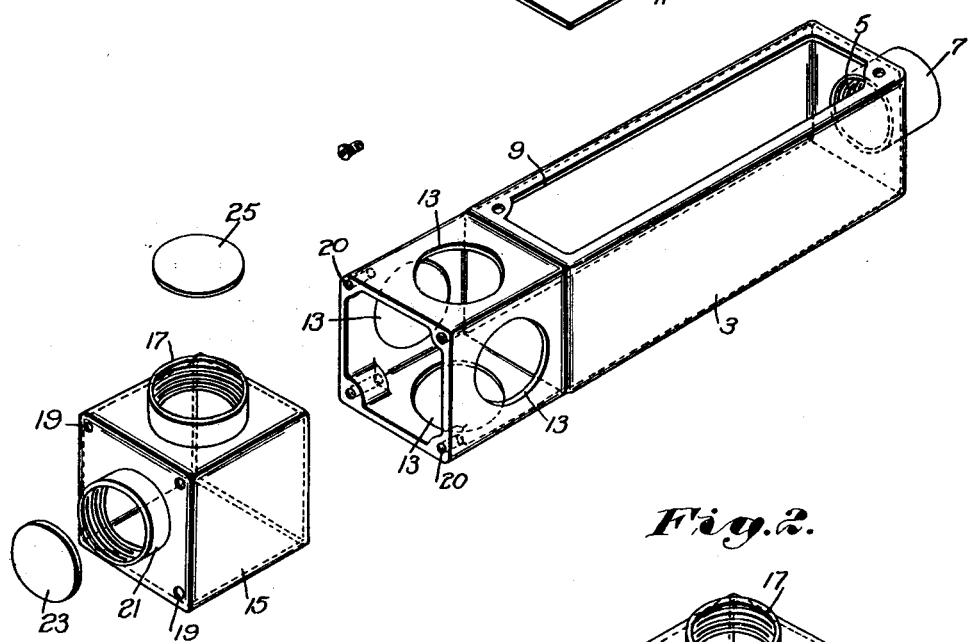
Fig. 1 is a perspective view of a junction box with the parts separated.

The fitting shown in the drawings is adapted for use with the so-called conduit type of wiring in which the wires are placed in pipes. The embodiment shown comprises an elongated body 3 here shown substantially in the form of a square prism. One base is closed and is provided with a suitable opening 5 providing for the attachment of the section of conduit thereto, and I have herein shown a projecting, interiorly threaded flange 7. In one side of the body there may be provided the opening 9 providing access to the ends of the wires in the interior of the box, which opening may be closed by the removable cover 11 and may be screwed in position by screws in well known manner. Near the other end of the body the sides are provided with apertures 13 facing in various directions, herein an aperture being provided at each of the four sides of the prism.

Cooperating with the body described is a suitable member adapted to cover certain of the apertures and provide for attachment of the conduit in such manner as to permit the wires to enter the box through a selected one of the apertures corresponding to the direction in which they lead to or from the box. Herein I show a box-like cap 15 telescopically fitting the end of the body 3, which may be reduced to receive it as shown. At least one side wall of the box has an opening providing means for attaching the conduit thereto as the threaded flange 17. The cap may be turned so that when placed in position the opening at 17 registers with any one of the apertures 13 and may be secured in position by screws entering through holes 19 and tapping into the openings 20 provided in the body. If parts are assembled in the relation shown in Fig. 1 of the drawings without turning the cap 15, the box with the connections at 7 and 17 will provide an L-shaped fitting with one of the connections leading from the front. By turning the cap so that 17 registers with one of the other openings, L-shaped fittings having a connection at the back, to the right or to the left are provided.

The base of the cap 15 is preferably provided with the threaded flange 21 which may be closed by a knock-out plug 23. With this plug removed, the box provides T-shaped fittings with the stem of the T corresponding to the opening at 17 in the front, at the back, to the right or to the left. If a knock-out plug 25 is provided for the flange 17, blocking it off, the device could be used as a straight connector.

Figure 2:
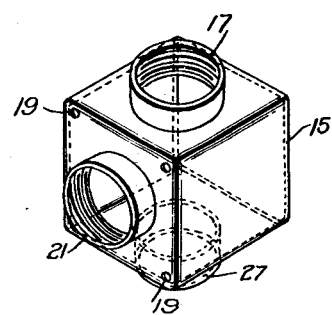
Fig. 2 is a similar view of a modified interchangeable form of one of the parts.

In Fig. 2 I have shown a device having a second threaded flange 27 in the side of the cap opposite flange 17. Such a cap in connection with a body formed as described provides fittings of the X or cross type, and the cross may extend either in a plane parallel to the opening 9 or in a plane transverse thereto in accordance with the manner in which the cap is turned on the body. The two types of caps are interchangeable with the form of body shown in Fig. 1.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. A junction box comprising a body having an end provided with means for mounting it on a conduit for access of conductors through said conduit to the interior of the body and a side wall rising from the end to extend substantially axially of the conduit, said wall having a covered opening providing access to the interior of the box and having a plurality of apertures facing in different directions adjacent the other end of the body and also comprising a cap having a base and a side wall telescoping with the side wall of the body, said side wall of the cap having an opening providing means for connecting a conduit thereto and registrable with one or another of said apertures by turning movement of the cap.

2. A junction box comprising a body having an end provided with means for mounting it on a conduit for access of conductors through said conduit to the interior of the body and a side wall rising from the end to extend substantially axially of the conduit, said wall having a covered opening providing access to the interior of the box and having a plurality of apertures facing in different directions adjacent the other end of the body and also comprising a cap having a base provided with means for connecting a substantially axially extending conduit and also having a side wall telescoping with the side wall of the body, said side wall of the cap having an opening providing means for connecting a conduit thereto and registrable with one or another of said apertures by turning movement of the cap.

3. A junction box comprising a body having an end provided with means for mounting it on a conduit for access of conductors through said conduit to the interior of the body and a side wall rising from the end to extend substantially axially of the conduit, said wall having a covered opening providing access to the interior of the box and having a plurality of apertures facing in different directions adjacent the other end of the body and also comprising a cap having a base provided with an opening having provision for connecting a substantially axially extending conduit thereto, which opening is provided with a knock-out plug and also having a side wall telescoping with the side wall of the body, said side wall of the cap having an opening providing means for connecting a conduit thereto and registrable with one or another of said apertures by turning movement of the cap.

4. A junction box comprising a body having an end provided with means for mounting it on a conduit for access of conductors through said conduit to the interior of the body and a side wall rising from the end to extend substantially axially of the conduit, said wall having a covered opening providing access to the interior of the box and having pairs of diametrically disposed apertures adjacent the other end of the body and also comprising a cap having a base and a side wall telescoping with the side wall of the body, said side wall of the cap having at diametral points openings provided with means for attachment of a conduit therein and registrable with one or another pair of the said apertures by angular adjustment of the cap relatively to the body.

In testimony whereof, I have signed my name to this specification.

FREDERICK H. MACNEIL.